Patented Aug. 31, 1937

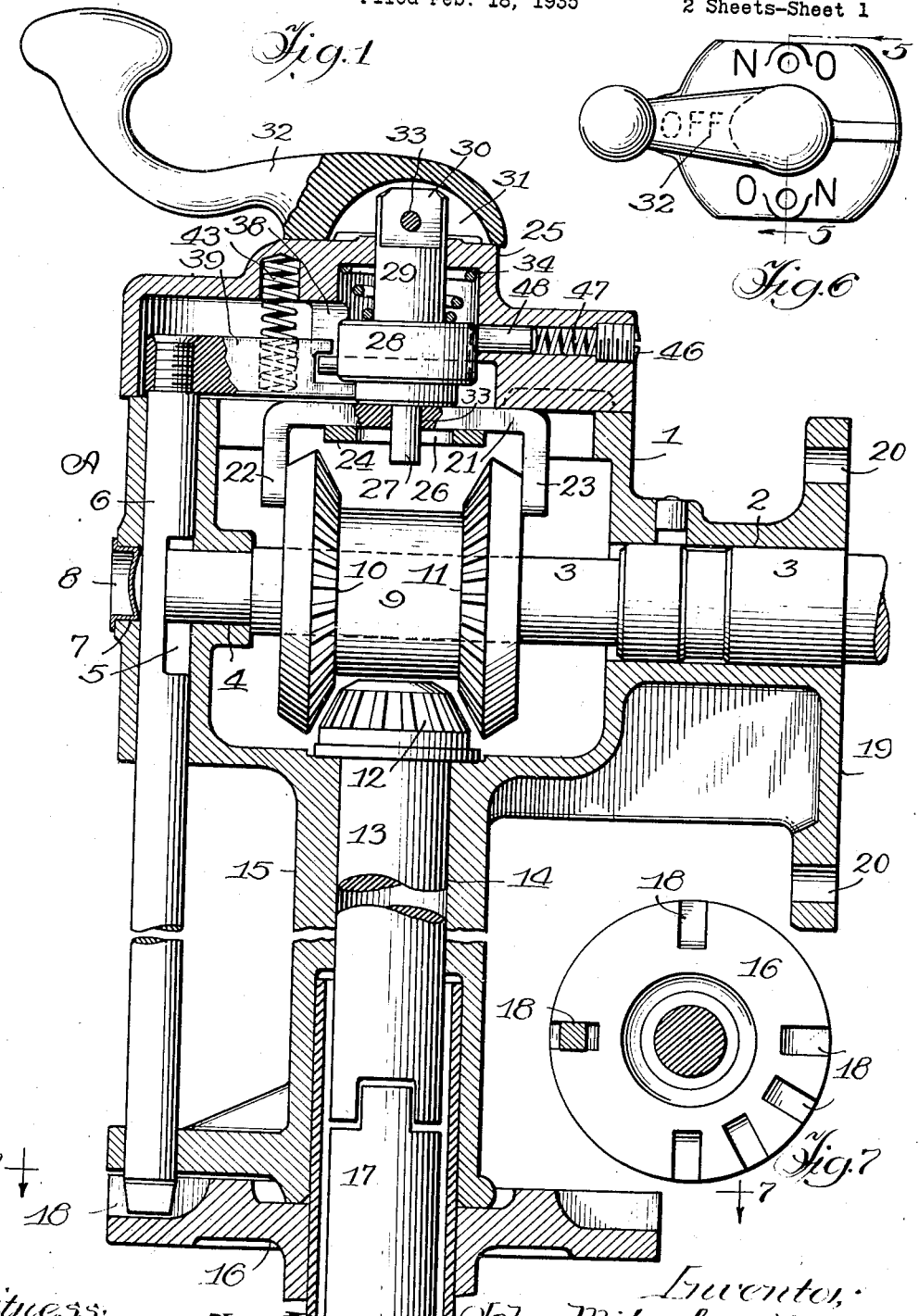

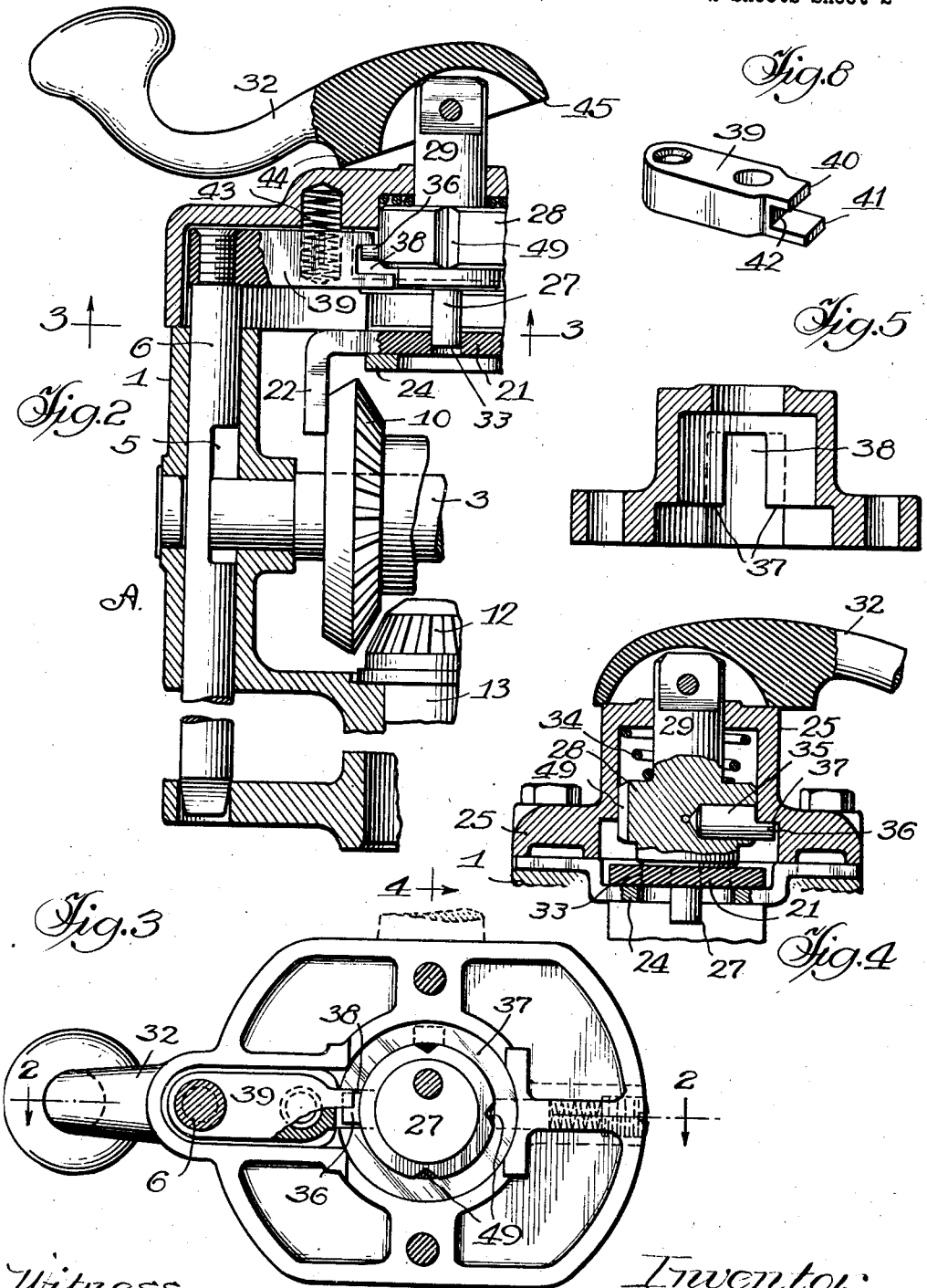

2,091,328

UNITED STATES PATENT OFFICE 2,091,328

GEAR SHIFTER FOR WRINGERS

John Mikulasek, Newton, Iowa, assignor to The Maytag Company, Newton, Iowa, a corporation of Delaware Application February 18, 1935, Serial No. 6,959

14 Claims. (Cl. 74—387)

This invention relates to gear shifter mechanism for power operated swinging wringers, and more particularly to such a device so arranged that the wringer cannot be swung in a horizontal plane except when the roll-operating clutch is in neutral position.

In power operated swinging wringers not provided with means to prevent the same, considerable damage can result to the operator by a blow from the wringer due to its swinging in a horizontal plane under action of the driving power because of the power being applied for rotating the rolls at a time when the wringer is not locked against swinging movement. Among the objects of the present invention is to provide improved mechanism for eliminating the above-mentioned danger and render it impossible to cause rotation of the wringer rolls except when the wringer frame is locked against swinging movement.

A further object is to provide mechanism of the class described, with the parts so arranged as to prevent water or moisture from entering the wringer head.

Another object is the provision of a gear shifting lever mounted on top of the wringer head, or gear casing, for rotation in a horizontal plane, but arranged to be tilted in a vertical plane only when the lever is in neutral position.

Still another object is the arrangement of parts such that the tilting movement of the gear shifting lever in a vertical plane is accompanied by a simultaneous vertical movement of some of the gear shifting parts and also the rod for locking the wringer frame against swinging.

A still further object is the provision of an annular shoulder beneath which a pin is slidably held to render the gear shifting lever incapable of tilting movement in a vertical plane when the lever is in any position away from neutral, and a vertical slot in the shouldered part to permit the pin to move thereinto and the lever to tiltingly move in a vertical plane only when the lever and roll operating clutch is in neutral position.

Another object is the provision of a device of the class described simple in construction, economical to manufacture, and efficient and reliable in operation.

Other objects, advantages and capabilities will later more fully become apparent.

My invention further resides in the combination, construction and arrangement of parts shown in the accompanying drawings, and while I have illustrated therein a preferred embodiment, I wish it understood that the same is susceptible of modification and change without departing from the spirit of my invention.

In the drawings:

Fig. 1 is a vertical longitudinal section througn the wringer head showing my invention applied therein, with the roll operating gears in neutral position, and the wringer locked against swinging in a horizontal plane.

Fig. 2 is a fragmentary view similar to Fig. 1, but showing the wringer unlocked so that it may be swung in a horizontal plane.

Fig. 3 is a horizontal sectional view taken on the line 3—3 of Fig. 2 and looking in the direction of the arrows.

Fig. 4 is a vertical section taken on the line 4—4 of Fig. 3 and showing the gear shifting lever in solid lines in a position for causing rotation of the rolls in one direction.

Fig. 5 is a section taken on the line 5—5 of Fig. 6 but with the shifting lever and other moving parts omitted.

Fig. 6 is a plan view (to smaller scale) of the top portion of Fig. 1 and showing the shifting lever in neutral position.

Fig. 7 is a top plan view of the supporting member provided with notches into any one of which a rod may be seated for locking the wringer in any one of a plurality of positions in a horizontal plane.

Fig. 8 is a perspective detail view of the arm to be secured to the top of the locking pin.

Referring more particularly to the drawings, the wringer head is indicated generally at A and comprises in general the gear casing 1 formed in its side wall with a bearing 2 in which is rotatably mounted the shaft 3 for driving the wringer rolls. This shaft at its opposite end is rotatably mounted in bearing 4 and projects a slight distance therebeyond to extend into notch 5 formed in locking rod 6. Opening 7 is formed in the gear casing 1 in alinement with bearings 2 and 4 to facilitate the boring and inspection of the same, and is closed by the removable cap 8. Splined onto shaft 3, to be held against rotation with relation thereto but have longitudinal sliding movement thereon, is a sleeve 9 which has fixed thereto or integrally formed on its ends the bevel gears 10 and 11, adapted to selectively engage the driving bevel gear 12 fixed to rotate with shaft 13 rotatably mounted in bearing 14 formed in the tubular portion 15 extending downwardly from the bottom of the gear casing 1. Tubular portion 15 fits over the tubular post x and rests upon the supporting member 16 and is adapted to turn thereon in a horizontal plane as the wringer is swung from one position to another. Supporting member 16 will preferably be fixed to a washing machine from the driving power of which power will be transmitted through vertical shaft 17, which, as shown, has driving connection with shaft 13 for driving the wringer rolls through gears 10, 11, 12 and shaft 3.

Formed in the upper face of supporting member 16 are a plurality of notches 18 to selectively receive the lower end of locking rod 6 for locking the wringer in any one of a plurality of positions in a horizontal plane to which it may be swung. The wringer frame (not shown) may be fastened to face 19 by bolts passing through openings 20, or otherwise as desired.

The shifting of gears 10 and 11 for selective engagement with driving gear 12 is effected by means of a bar 21, which at each end has downturned portions 22 and 23 which slidably fit over the outer faces of gears 10 and 11, respectively, so that as bar 21 is moved back and forth gears 10 and 11 will be moved longitudinally of shaft 3 to cause either of said gears to engage gear 12 as desired for rotating the wringer rolls in the desired direction. Shifting bar 21 is held in its proper position by plate 24, which is bent as shown in Fig. 4 to provide a seat, in which bar 21 slides longitudinally. The ends of plate 24 are held in fixed position by being clamped between the edges of cap 25 and gear casing 1. An opening 26 is formed in plate 24 to accommodate the circular movement of crank pin 27, which is eccentrically fixed in the lower face of the rotatable head 28, which is provided with an upstanding stem 29 having the two sides of its upper end flattened at 30 to loosely fit into groove 31 of the gear shifting lever 32, with which it is pivotally connected by pin 33. This connection forces stem 29 and head 28 to rotate when lever 32 is swung laterally in a horizontal plane and also permits lever 32 to be moved or tilted in a vertical plane at the proper time.

Bar 21 is formed with a laterally extending slot 33 to accommodate movement of crank pin 27 as lever 32 is swung laterally, head 28 rotated, and bar 21 moved back and forth in shifting the gears 10 and 11. A coil spring 34 is seated between the upper face of head 28 and the inner face of cap 25 to normally press head 28 downwardly and hold lever 32 as shown in Fig. 1. Fixed in the circumferential edge of head 28 is a pin 35 whose portion 36 projects beyond head 28 and has its upper half removed as seen in Fig. 4. This projecting portion 36 thus has a flat upper face which slidingly engages the lower face of the annular shoulder 37 formed in cap 25. Thus at all times, except when the projecting end 36 of pin 35 is in registry with slot 38, the head 28 and stem 29 are held positively against upward movement and the outer free end of lever 32 cannot for this reason be moved downwardly or tilted in a vertical plane. This vertical tilting movement of lever 32 and upward movement of head 28 and stem 29, can, however, take place when end 36 of pin 35 is carried by rotation of head 28 into registry with slot 38.

Fixed upon the upper end of locking rod 6 is an arm 39 which at its free end has a pair of vertically spaced lips 40, 41, forming therebetween a space or recess 42. Lips 40, 41 extend into slot 38 but are held at the bottom of the slot by spring 43 which normally urges arm 39 downwardly and holds the lower end of locking rod 6 in its respective notch 18 of supporting member 16. When arm 39 is held in its lower position by spring 43, as shown in Fig. 1, recess 42 between lips 40 and 41 will be in position to permit end 36 of pin 35 to move thereinto (and underneath lip 40) when said end 36 is moved by handle or lever 32 into registry with slot 38. When the parts are in this position the gears 10 and 11 are in neutral position with relation to driving gear 12, as shown in Fig. 1. And because of slot 38, it is only when the parts are in this position that the outer free end of shifting lever 32 can be depressed to cause a vertical tilting movement of this lever. During this tilting movement (see Fig. 2) the lever tilts about its lower edge 44, which elevates edge 45 and raises head 28 and stem 29 against the action of spring 34. This upward movement of head 28 also carries upward the projecting end 36 of pin 35, which being at this time beneath lip 40 of arm 39 also carries upwardly with it arm 39 and locking rod 6, thus freeing the lower end of this rod from locking notches 18 and permitting the wringer to be swung in a horizontal plane, but only at a time when the clutch for driving the rolls is in a neutral position.

Upon release of the lever 32 the parts will be returned to their lowered position by springs 34 and 43, and the end 36 of pin 35 can then be moved under the annular shoulder 37 upon rotation of lever 32 and head 28 as the gears are being brought into driving engagement. Because of this pin end 36 being under shoulder 37 head 28 is held against upward movement and it is thus impossible to unlock the lower end of rod 6 from its notch 18 while the gears for driving the wringer rolls are in driving engagement.

The gear shift lever is shown in neutral position in Figs. 1 and 2, that is, with the roll driving gears out of engagement, and in Fig. 4 the lever is shown in that position it would occupy when the gears are in driving engagement.

Held in a suitable bore by plug 46 is a spring 47 which yieldingly urges the V-shaped or pointed end of pin 48 into any one of a plurality of notches 49 formed in the edge of head 28, so that head 28 and its associated parts will be held steady against movement by vibration of the moving parts. When it is desired to rotate head 28, by means of lever 32, lateral pressure upon the lever will, due to the yielding of spring 47 force the end of pin 48 out of its corresponding notch until it again is forced into another notch. The neutral and clutch engaging positions of lever 32 are indicated by "Off" and "On" respectively in Fig. 6.

Having now described my invention, I claim:—

1. In combination a gear shifting and wringer locking device for wringers, comprising a supporting member having stop portions, a locking pin adapted to be moved into and out of locking engagement with said stop portions, a driving gear, a pair of gears selectively shiftable into and out of engagement with said driving gear for driving the rolls of the wringer in either direction, gear shifting mechanism including a rotatable and longitudinally movable member having a pin projecting from one edge, a hollow member encircling said rotatable member and provided with an annular shoulder and a slot, a lever for rotating said rotatable member, an arm fixed to said locking pin and extending laterally therefrom, said arm having at its end a recessed portion lying in said slot and normally in alinement with said annular shoulder, the free end of the lever being depressible only when the gears are in neutral position and the pin on the rotatable member lying in the recessed portion of said arm and in the slot whereby to lift the locking pin into unlocking position when the free end of the lever is depressed.

2. A combined gear shifting and locking device for wringers, comprising a support having a plurality of stop portions thereon for holding a wringer in any one of a plurality of positions in a horizontal plane, a gearing casing containing gears, gear shifting means, a locking pin movable into and out of engagement with said stop portions, a lever for operating the gear shifting means, said lever being tiltable downwardly at its free end only when said gears are in a neutral position, means to prevent such tilting movement when the gears are in driving engagement, and means for elevating said locking pin when said lever is tilted, said last mentioned means comprising a rotatable member carrying a projection, said member and projection being rotatable together in a horizontal plane, means for holding said projection against vertical movement when the driving gears are in driving engagement, said last mentioned means having a vertical opening with which the projection registers only when the gears are in neutral and at which time the downward tilting of the free end of the lever causes the projection to move vertically upward in said opening and move the locking pin to unlocked position.

3. A combined gear shifting and locking device for wringers, comprising a support having a plurality of stop portions thereon for holding a wringer in any one of a plurality of positions in a horizontal plane, a gear casing containing gears, gear shifting means, a locking pin movable into and out of engagement with said stop portions, a lever for operating the gear shifting means, said lever being tiltable downwardly at its free end when in neutral position, means for elevating said locking pin when said lever is tilted, said last mentioned means comprising a member rotatable in a horizontal plane and carrying a projection, means for holding said projection and member against vertical movement when the driving gears are in driving engagement, said gear casing having a slot therein into which the projection moves to enable the projection to be moved upwardly and carry with it the locking pin to unlocking position.

4. A gear shifting device for wringers comprising a casing, a vertical support having a plurality of stop portions thereon for holding a wringer in any one of a plurality of positions in a horizontal plane, a vertical driving shaft in said vertical support, a driving pinion driven by said driving shaft, a horizontal roll shaft having a pair of spaced gears slidably mounted thereon for selective engagement with said driving pinion to enable rotation of said roll shaft in either direction, means for shifting said spaced gears into selective engagement with said driving pinion, a vertically slidable locking pin for selectively engaging any one of said stop portions, a shouldered recess in the upper portion of said gear casing, said gear shifting means including a head rotatably mounted in said recess, a pin projecting laterally from said head and normally riding against the undersurface of the shoulder of said recess, a slot in one side of said shouldered recessed portion, with which slot said laterally projecting pin may be brought into alignment when the gears are in neutral, a laterally extending arm fixed to the top of said vertically slidable pin, said arm having a projection extending into said slot, and a lever on top of the casing, said lever being pivotally connected to said head and being movable in both a horizontal and vertical plane, movement of the free end of the lever in a vertical plane downwardly causing elevation of the locking pin only when said pin on the gear shifting head is in the slot.

5. In a gear shifting device for wringers, a gear casing, a vertical support having a plurality of stop portions thereon for holding a wringer in any one of a plurality of positions in a horizontal plane, a vertical drive shaft in said vertical support, a horizontal wringer shaft, gears selectively connecting said horizontal shaft and said vertical driving shaft, means for shifting said gears into either driving engagement or neutral position as desired, a vertically slidable locking pin in said casing for selectively engaging any one of said stop portions, a lever on top of said gear casing mounted for movement in both a horizontal plane and a vertical plane, said gear shifting means including a rotatable head for moving said gears into and out of driving engagement, said lever being pivotally connected to said head, said casing having an obstruction for said head to prevent its vertical movement in all positions except when the gears are in neutral, said obstruction having a cutaway portion to enable vertical movement of the head when the gears are in neutral and the free end of the lever is depressed, said locking pin and said head being laterally spaced apart, and means connecting said pin and said head so that they may move vertically together when the gears are in neutral position.

6. In combination a gear shifting and locking device for wringers comprising a gear casing, a vertical support, a vertically slidable pin for releasably locking said gear casing against rotation in a horizontal plane about said support, a shaft in said support, a horizontal wringer shaft in said casing, gears in said casing for driving the horizontal shaft from the shaft in the support, gear-shifting means for shifting some of said gears to selectively drive the horizontal shaft in either direction or stop it in neutral position, said last mentioned means comprising a head rotatable in a horizontal plane to operate the gear shifting means, stop means to prevent said head from moving vertically except when the gears are in neutral, said vertically slidable pin being laterally offset from said head, an arm secured to said pin and extending laterally to position its end adjacent the head, said head being vertically movable only when in neutral position, and means on said head to engage said arm and move the pin vertically upward when the head moves upward.

7. In combination a gear shifting and locking device for wringers comprising a gear casing, a vertical support, a vertically slidable pin for releasably locking said gear casing against rotation in a horizontal plane about said support, a shaft in said support, a horizontal wringer shaft in said casing, gears in said casing for driving the horizontal shaft from the shaft in the support, gear-shifting means for shifting some of said gears to selectively drive the horizontal shaft in either direction or stop it in neutral position, said last mentioned means comprising a head rotatable in a horizontal plane to operate the gear shift, stop means to prevent said head from moving vertically except when the gears are in neutral, said vertically slidable pin being laterally offset from said head, an arm secured to said pin and extending laterally to position its end adjacent the head, said head being vertically movable only when in neutral position, means on said head to engage said arm and move the pin vertically upward when the head moves upward, said gear shifting means also including means for moving said head rotationally or vertically as desired.

8. A combined gear shifting and locking device for wringers, comprising a support having a plurality of stop portions thereon for holding a wringer in any one of a plurality of positions in a horizontal plane, a gear casing containing gears, gear shifting means, a locking pin movable into and out of engagement with said stop portions, said gear shifting means comprising a head rotatable in a horizontal plane, said head and said locking pin having parts which interengage only when in a predetermined relative position, means holding said head against vertical movement when the gears are in driving engagement, said last mentioned means having a recess to enable said rotatable head to be lifted vertically to lift the locking pin away from engagement with said stop portions only while the gears are in neutral position, and a lever pivotally mounted on top of said casing for pivotal movement in both horizontal and vertical directions for rotating said head and moving it vertically.

9. In combination a gear shifting and locking device for wringers, comprising a gear casing, a driving shaft and a driven shaft, gears in said gear casing for driving the driven shaft from the driving shaft, gear shifting mechanism within the casing for causing the driven shaft to be driven selectively in either direction, and a locking pin for locking the wringer against swinging movement in a horizontal plane, a shifting lever on top of the gear casing and connected to the gear shifting mechanism for operating the same, said lever being depressible at its free end only when the gears are in neutral, a portion of the gear shifting mechanism within the casing moving vertically upward when the free end of the lever is depressed, means for preventing upward movement of said portion of the gear shifting mechanism when the gears are in driving engagement, but enabling such movement when the gears are in neutral, and means for connecting said locking pin with said upwardly moving part of the gear shifting mechanism when the gears are in neutral so that said locking pin and said upwardly moving part will move upwardly together to unlock the locking pin to permit the wringer to be swung in a horizontal plane only when the shift mechanism is in neutral.

10. In combination a gear shifting and locking device for wringers, comprising a gear casing containing a driving gear, mechanism for connecting said driving gear to a shaft for driving wringer rolls selectively in either direction, and a locking pin for locking the wringer against swinging movement in a horizontal plane, a shifting lever on top of the gear casing and connected to said mechanism for operating the same, said lever being depressible at its free end when said mechanism is in neutral, means for causing a portion of said mechanism to move vertically upward when the free end of the lever is depressed, said locking pin being so connected with said upwardly moving part of said mechanism that they will move upwardly together to unlock the locking pin to enable the wringer to be swung in a horizontal plane, means including an obstruction within the casing to prevent the upward movement of the locking pin when said mechanism is in driving position, means within the casing for causing a temporary interengagement between the locking pin and the vertically movable part, and an interruption in said obstruction to enable said locking pin and the vertically movable portion of said mechanism to move vertically together only when said mechanism is in neutral.

11. In combination a gear shifting and locking device for wringers, comprising a gear casing containing gears, gear shifting means, and a locking pin for locking the wringer against swinging in a horizontal plane, said gear shifting means comprising a portion within the casing and rotatable therein for shifting the gears and also being movable vertically within the casing when the gears are in neutral, a shifting lever on the outside of said casing operatively connected to rotate the rotatable portion within the casing, an obstruction within the casing which holds said rotatable portion against vertical movement when said gears are in driving engagement, a slot in said obstruction, the locking pin having at its upper end a laterally extending arm extending into said slot, and means on said rotatable portion to engage said arm when the rotatable portion is rotated to neutral position and move out of engagement with said arm when said rotatable portion is rotated out of neutral position, so that the locking pin will be moved upwardly when the rotatable portion is moved upwardly but at no other time.

12. In combination a gear shifting and wringer locking device for wringers, comprising a casing, gears in said casing for selectively driving the wringer rolls in either direction, gear shifting mechanism including a rotatable head in said casing, a locking pin, and a gear shifting lever for operating the gear shifting mechanism and the locking pin, a shoulder in the casing for holding the head against vertical movement except when the gears are in neutral, an opening in said shoulder to enable vertical movement of said head when a certain portion of the head registers with the opening, said locking pin having a projection extending into said opening and vertically movable therein, means on said head for engaging said projection when the head is rotated to neutral position, said lever being depressible at its free end only when the gears are in neutral position, said lever when depressed elevating said head within the casing to elevate said locking pin to permit horizontal swinging of the wringer.

13. In combination a gear shifting and wringer locking device for wringers, comprising a casing, gears in said casing for selectively driving the wringer rolls in either direction, gear shifting mechanism, a locking pin, and a gear shifting lever for operating the gear shifting mechanism and the locking pin, said lever being depressible at its free end only when the gears are in neutral position, said gear shifting mechanism including a rotatable head in the casing, means for holding the head against vertical movement except when in one position, means for permitting upward vertical movement of the head and locking pin when the lever is depressed and the head is in said one position, the lever being depressible at its free end only when said head is rotated to said one position, the locking pin having a portion that interengages with said head only when the latter is in said one position, which position is that occupied by the head when the gears are in neutral.

14. In combination a gear shifting and locking device for wringers comprising a gear casing, a support upon which said casing is rotatably mounted, gears in the casing adapted to drive a wringer roll, a locking pin slidably mounted in a part of the casing, a gear shifting head mounted in the casing for gear shifting rotation, means for holding said head against vertical movement when said gears are in driving connection with the roll, means for enabling vertical movement of said head when said gears are in neutral position, a lever pivotally connected with said head, and means connecting the locking pin with said head when the gears are in neutral position whereby the free end of the lever may be depressed and the locking pin moved to unlocking position only when the gears are in neutral position.

JOHN MIKULASEK.